United States Patent
Sane et al.

(10) Patent No.: US 8,834,604 B2
(45) Date of Patent: Sep. 16, 2014

(54) HIGH TEMPERATURE GAS PROCESSING SYSTEM AND METHOD FOR MAKING THE SAME

(75) Inventors: Ajit Y. Sane, Medina, OH (US); Thomas L. Cable, Olmsted Falls, OH (US)

(73) Assignee: Volt Research, LLC, Canton, OH (US)

( * ) Notice: Subject to any disclaimer, the term of this patent is extended or adjusted under 35 U.S.C. 154(b) by 313 days.

(21) Appl. No.: 13/234,880

(22) Filed: Sep. 16, 2011

(65) Prior Publication Data

US 2012/0067210 A1    Mar. 22, 2012

Related U.S. Application Data

(60) Provisional application No. 61/383,536, filed on Sep. 16, 2010.

(51) Int. Cl.

| | | |
|---|---|---|
| *B01D 53/22* | (2006.01) | |
| *B23B 5/14* | (2006.01) | |
| *B01D 69/02* | (2006.01) | |
| *H01M 8/12* | (2006.01) | |
| *B01D 71/02* | (2006.01) | |
| *B01D 69/12* | (2006.01) | |

(52) U.S. Cl.
CPC .............. *B01D 53/228* (2013.01); *B01D 69/02* (2013.01); *B01D 2325/023* (2013.01); *H01M 8/1246* (2013.01); *B01D 71/024* (2013.01); *B01D 2256/12* (2013.10); *B01D 71/022* (2013.01); *B01D 2325/02* (2013.01); *B01D 69/12* (2013.01); *B01D 2257/102* (2013.01); *H01M 2008/1293* (2013.01); *B01D 2325/10* (2013.01); *B01D 2256/16* (2013.01); *H01M 2300/0074* (2013.01)
USPC .................... 95/54; 95/45; 96/11; 423/648.1; 423/651; 428/310.5

(58) Field of Classification Search
USPC ................ 95/45, 51, 54; 96/4, 11; 428/310.5; 422/187; 423/418.2, 651, 648.1
See application file for complete search history.

(56) References Cited

U.S. PATENT DOCUMENTS

| | | |
|---|---|---|
| 4,793,904 A | 12/1988 | Mazanec et al. |
| 4,802,958 A | 2/1989 | Mazanec et al. |
| 4,933,054 A | 6/1990 | Mazanec et al. |
| 5,160,713 A | 11/1992 | Mazanec et al. |
| 5,306,411 A | 4/1994 | Mazanec et al. |
| 5,591,315 A | 1/1997 | Mazanec et al. |
| 5,648,304 A | 7/1997 | Mazanec et al. |

(Continued)

OTHER PUBLICATIONS

Christie et al., Zero Emission Power Plants Using Solid Oxide Fuel Cells and Oxygen Transport Membranes, Final Report, Seimens Westinghouse Power Corporation, Jun. 10, 2003, 29 pages.

*Primary Examiner* — Jason M Greene
(74) *Attorney, Agent, or Firm* — Hahn Loeser & Parks LLP

(57) ABSTRACT

A membrane for use in a high temperature gas processing system and method for making the same. The membrane includes a dense, gas impermeable layer and a first and second porous layer, wherein each of the first and second porous layers is a ceramic oxide material having a non-symmetrical load bearing skeleton of a plurality of pores having a graded porosity. Each porous layer provides a reduction of an oxygen partial pressure gradient across the dense layer and reduces resultant stresses in the dense layer that are small compared to its strength thereby improving long term mechanical durability of the dense layer.

8 Claims, 1 Drawing Sheet

(56) References Cited

U.S. PATENT DOCUMENTS

Figure 1:
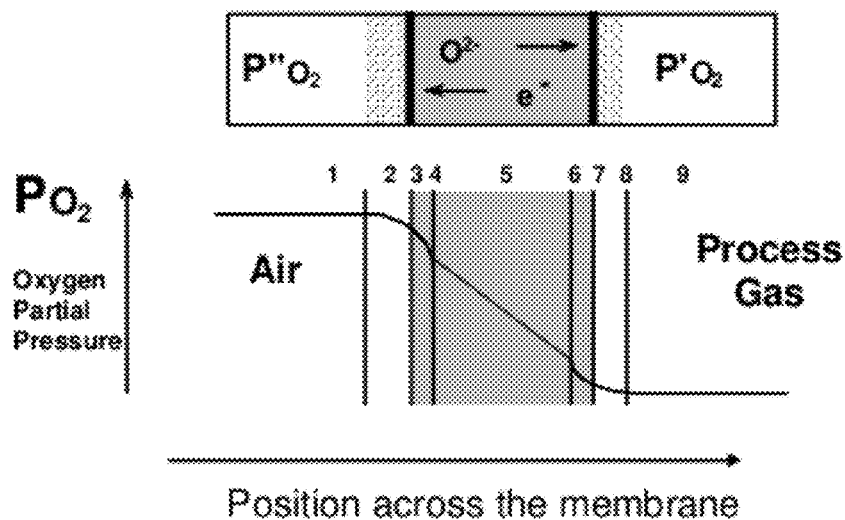

| Patent Number | Date | Inventor | Class |
|---|---|---|---|
| 5,693,212 A | 12/1997 | Mazanec et al. | |
| 5,702,999 A | 12/1997 | Mazanec et al. | |
| 5,714,091 A | 2/1998 | Mazanec et al. | |
| 5,723,035 A | 3/1998 | Mazanec et al. | |
| 5,744,015 A | 4/1998 | Mazanec et al. | |
| 5,938,822 A * | 8/1999 | Chen et al. | 96/11 |
| 6,139,810 A | 10/2000 | Gottzmann et al. | |
| 6,153,163 A | 11/2000 | Prasad et al. | |
| 6,238,816 B1 | 5/2001 | Cable et al. | |
| 6,368,383 B1 * | 4/2002 | Virkar et al. | 95/54 |
| 6,949,307 B2 | 9/2005 | Cable et al. | |
| 7,018,446 B2 * | 3/2006 | Alvin et al. | 96/11 |
| 7,033,470 B2 | 4/2006 | Mazanec et al. | |
| 7,195,742 B2 | 3/2007 | Liu et al. | |
| 7,534,519 B2 | 5/2009 | Cable et al. | |
| 8,323,463 B2 * | 12/2012 | Christie et al. | 95/54 |
| 2003/0155254 A1 | 8/2003 | Mazanec et al. | |
| 2006/0127749 A1 | 6/2006 | Christie et al. | |
| 2006/0131182 A1 | 6/2006 | Mazanec et al. | |
| 2007/0025909 A1 * | 2/2007 | Krist et al. | 423/648.1 |
| 2007/0065701 A1 | 3/2007 | Cable et al. | |
| 2008/0047431 A1 | 2/2008 | Nagabhushana et al. | |
| 2009/0019771 A1 * | 1/2009 | Pearson | 48/86 R |
| 2009/0180949 A1 * | 7/2009 | Cui et al. | 423/651 |
| 2009/0193975 A1 * | 8/2009 | Meulenberg et al. | 96/11 |
| 2011/0020192 A1 * | 1/2011 | Baumann et al. | 96/11 |
| 2012/0310027 A1 * | 12/2012 | Kjolseth et al. | 96/11 |

* cited by examiner

HIGH TEMPERATURE GAS PROCESSING SYSTEM AND METHOD FOR MAKING THE SAME

CROSS-REFERENCE TO RELATED APPLICATIONS

This patent application claims the benefit of U.S. Provisional Patent Application No. 61/383,536, filed Sep. 16, 2010, the disclosure of which is expressly incorporated by reference herein.

TECHNICAL FIELD

The present invention relates generally to energy technologies by more efficient high temperature gas processing and durable system in fields as diverse as the reforming of natural gas to liquid fuels or to produce low cost hydrogen from other hydrocarbon fuels, as well as biomass such as cellulose, lignin or their derivatives. In addition, this invention relates generally to the field of high temperature solid oxide fuel cells (SOFCs), relating to the improvement in the ceramic fabrication of such cells and their reliability.

BACKGROUND OF THE INVENTION

There are several commercial needs for more efficient high temperature gas processing whether it is for converting natural gas to liquid fuels or produce low cost hydrogen from hydrocarbon fuels, or produce low cost syngas from a flexible feedstock including natural gas, steam, hydrocarbons, including heavy hydrocarbons such as diesel and jet fuel, as well as cellulose, lignin, coal or their derivatives.

Converting natural gas into synthetic liquid fuels is used in the general field called "reforming", where commercialization of this process is hampered by the high cost of producing "syngas", a mixture of $CO+H_2$. In this case, the reaction of methane and steam to produce CO and $H_2$ is highly endothermic and requires significant amounts of heat input. An alternative route is to inject pure oxygen so that the partial oxidation of methane can provide the needed thermal energy and balances the steam reforming process, this is commonly called PDX. However, this solution requires the high capital cost associated with separating oxygen from air.

A less costly route, commonly used by fuel cell developers, generally called autothermal reforming, is to co-feed air directly with the natural gas which initiates the PDX reaction and the production of syngas, the remainder of the $O_2$ required comes through the electrolyte membrane, generating electricity. This achieves the heat generation but causes a problem by adding large amounts of nitrogen that must be heated; this causes problems downstream in that it limits the option to recycle the fuel cell exhaust, which contains up to 20% unspent fuel, but mixed with a significant amount of nitrogen.

An alternate route for fuel processing is to use oxygen conducting ceramic membranes to separate pure oxygen from air and simultaneously react it with the methane and/or other feedstock such as hydrocarbons, polymers such as cellulose, lignin, coal or their derivatives and steam to produce CO and $H_2$. This balances the exothermic reaction and the endothermic reaction, and has the advantage of not injecting the non required nitrogen. The syngas produced can then be converted into liquid fuels during downstream gas processing. This novel process however is limited by reliability of the ceramic membranes. During their use, one side of the ceramic membrane is exposed to air while the other side is exposed to a reducing gas mixture including methane, steam, carbon monoxide and hydrogen. As a result, there is a significant oxygen gradient across the membrane.

These oxygen separating oxide ceramics include either single phase or dual phase materials consist at least one of the following: mixed conducting membranes, belonging to the perovskite family of oxide ceramics or oxides of fluorite family. Under low oxygen partial pressure encountered in suitable feedstock, these ceramics undergo expansion or contraction due to variations in oxygen vacancy concentration, which is dependent on the gradient in partial pressure of oxygen in the environment to which these membranes are subjected.

During operation, steep gradients in oxygen vacancy concentration often cause unacceptably high stresses. The value of tensile stresses is sufficiently high compared to tensile strength that the mechanical durability of these membranes is compromised and they undergo either catastrophic failure or time dependent progressive strength degradation.

Therefore, in order to be commercially viable, there is a need to develop oxygen conducting ceramic membranes that are substantially insensitive to variation in oxygen partial pressure of the feed gases. Alternatively the value of partial pressure of oxygen at the fuel-membrane interface has to be kept sufficiently high so that the stresses are kept to a low value compared to the strength of the membrane. However, such an increase in the partial pressure of oxygen at the interface reduces the driving force needed to achieve high oxygen flux. To compensate for this reduction, membrane thickness has to be reduced making it more susceptible to mechanical failure.

SUMMARY OF THE INVENTION

In general, one aspect of the invention is to provide a gas processing system comprising a membrane that includes an oxygen ionic conducting, gas impermeable, non-porous dense layer in which one side of the dense layer is exposed with a first oxygen rich gas, typically air, while the other side of the dense layer is exposed to second oxygen deficient gas or a mixture of gas and solids having a partial pressure of oxygen well below the partial pressure of oxygen on the other side of the dense layer. The membrane has a porous material layer on each side to reduce the oxygen potential gradient across the membrane to the extent at which resultant stresses are well below its strength. The stresses in the membrane are directly proportional to the difference between oxygen vacancy concentration (which is proportional to oxygen partial pressure) at a given thickness and its average value across its thickness. Specifically, maximum tensile stress is less than one-half of the tensile strength, and preferably below 30% of the tensile strength provided Weibull modulus of the strength distribution is sufficiently high preferably above 6. The porous material layers on each side of the non-porous dense layer provide structural support as well as provide high surface area and/or catalytically active surface for gas/solid reactions at the membrane interface.

In another aspect of the invention, the dense layer may contain either single phase or multiple phase materials with at least one phase conducting oxygen ions across the dense layer. The other phases provided by the dense layer materials include, but are not limited to, allowing densification of the dense layer, conducting electrons across the dense layer, increasing the strength of the dense layer, and providing a catalytically active phase.

The dense layer materials include, but are not limited to, perovskites ($ABO_3$), fluorites ($ABO_2$), and purely electronic conductors.

In accordance with another aspect of the invention, there is provided a membrane for use in a high temperature gas processing reactor. The membrane includes a dense, gas impermeable layer, wherein the dense layer is a ceramic oxide material that conducts ions, electrons, and combinations thereof, a first and second porous layer, wherein each of the first and second porous layers is a ceramic oxide material having a non-symmetrical load bearing skeleton of a plurality of pores having a graded porosity, and wherein the dense layer is positioned between the first and second porous layers such that a first gas is contactable with the first porous layer of the membrane and a second gas is contactable with the second porous layer, wherein each porous layer provides a reduction of an oxygen partial pressure gradient across the dense layer and reduces resultant stresses in the dense layer that are small compared to its strength thereby improving long term mechanical durability of the dense layer.

In accordance with yet another aspect of the invention, there is provided a method of processing at least two gasses in a gas processing system. The method includes the steps of providing a membrane including a dense, gas impermeable layer, wherein the dense layer is a ceramic oxide material that conducts ions, electrons, and combinations thereof, a first and second porous layer, wherein each of the first and second porous layers is a ceramic oxide material having a non-symmetrical load bearing skeleton of graded porosity, and wherein the dense layer is positioned between the first and second porous layers, contacting the first porous layer with a first gas and the second porous layer with a second gas, wherein each porous layer provides a reduction of an oxygen partial pressure gradient across the dense layer and reduces resultant stresses in the dense layer that are small compared to its strength thereby improving long term mechanical durability of the dense layer, and producing a product selected from the group consisting of precursors to liquid fuels (e.g., synthesis gas), hydrogen gas, and carbon monoxide.

In accordance with one still yet another aspect of the invention, there is provided a process to fabricate a membrane with a graded porosity on either side of a dense gas impermeable layer, but reduce the thickness of the dense layer to compensate for the reduction in driving force These and other objects of this invention will be evident when viewed in light of the drawings, detailed description, and appended claims.

DETAILED DESCRIPTION OF THE DRAWINGS

Figure 2:
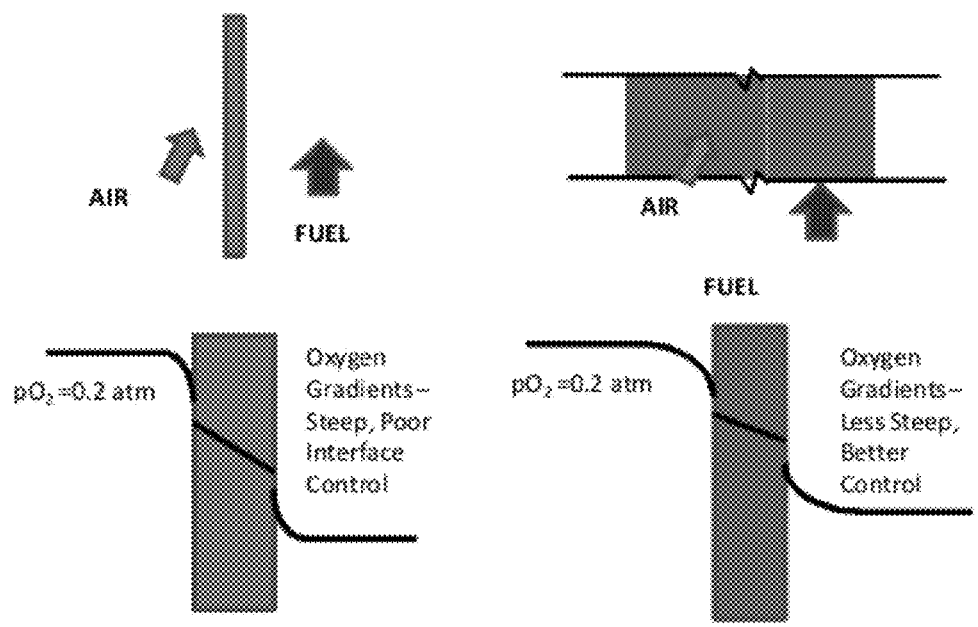

FIG. 1 illustrates a representative membrane for use in a gas processing system according to one embodiment of the invention and shows an oxygen partial pressure across the membrane; and FIG. 2 illustrates oxygen and electron transport across a conventional membrane and a membrane according to one embodiment of the present invention in order to maintain charge neutrality.

DETAILED DESCRIPTION OF THE INVENTION

Referring now to the drawings wherein the showings are for purposes of illustrating embodiments of the invention only and not for purposes of limiting the same, the Figures show a membrane usable in a high temperature gas processing system.

One embodiment of the invention is to provide a membrane with a graded porosity on each side of a dense, gas impermeable layer, and to reduce the thickness of the dense membrane to compensate for the reduction in driving force in a high temperature gas processing system. Prior art membranes do not involve the creation of such graded porosity to achieve stress management within a dense membrane wall. The prior art fails to recognize the stress management during operation of these membranes. As such, membranes were prone to mechanical failure due to generation of excessive stresses within the dense membrane body. The stress varies from a maximum value at the surface to its opposite value on the other side of the membrane, so as to fulfill equilibrium requirement. Therefore only the tensile stress is listed as a function of partial pressure of oxygen at the fuel-membrane interface. On the air side, partial pressure of oxygen is fixed at 0.2 atm. An example of such a membrane with graded porosity is shown in FIG. 1 and an example of a conventional membrane compared to a membrane with graded porosity is shown in FIG. 2. Stresses in typical oxygen ion conductive perovskite membranes are listed in Table I. The membrane, when utilized in the high temperature gas processing system, is typically exposed to a temperature of at least 500° C., and preferably to a temperature in a range between about 800° C. and about 1,100° C.

TABLE I

| Oxygen partial pressure: fuel-membrane interface [log $pO_2$] @ 1000° C. | Stress at the interface (psi) | Comments (Typical membrane strength ~25000 psi *) |
|---|---|---|
| −4.5 (typical nitrogen; inert) | −9,800 | Surface under compression; too low driving force |
| −10.1 (moderate reducing) | 1,226 | Desirable; sufficient driving force for high flux |
| −11.5 (moderate reducing) | 6,682 | Desirable; sufficient driving force for high flux |
| −12.2 | 9,400 | Marginally acceptable |
| −14.1 | 19,340 | Not acceptable; likely to result in failure |
| −15.6 (highly reducing) | 152,800 | Membrane will fracture before reaching this value |

* Weibull modulus >6

As seen in FIG. 1, the membrane includes on one side of the dense layer (sections 3-7) is a first gas (sections 1-2), preferably air, and the other side a second gas (sections 8-9), which in one embodiment is process gas. The process gas may be a gas or a mixture of solids and gas. The dense layer (sections 3-7) may be a single phase material of uniform composition or multi-phase material containing at least one ionic conductor.

The membrane of the gas processing system, according to an embodiment of the present invention, includes the following components:

Section 1: This is section of the first gas in the gas processing system. The gas shown here has a higher partial pressure of oxygen when compared to the partial pressure of oxygen of the second gas. In one embodiment, the first gas is air.

Sections 2 and 8: These areas represent the first and second porous layers of the membrane created to control the gradient across the dense layer as depicted in FIG. 2 where the effect of porous layer on oxygen gradient in a dense membrane is compared with the gradient in a bare membrane.

Sections 3-7: This area represents the gas impermeable, dense membrane with sections 3-4 and 6-7 showing the effect of boundary layer and membrane interface on oxygen partial pressure gradient.

Section 9: This is the section of the second gas in the gas processing system. The gas shown here has a partial pressure of oxygen that is lower than the first gas. Typically, the second gas or fuel is a hydrocarbon or it can be a mixture of hydrocarbon, natural gas, alcohols, steam, gasification products of coal, cellulose, lignin and the like with partial pressure of oxygen less than $10^{-10}$ atm. including solids associated with these feed stocks, and solids containing carbonaceous or hydrocarbon derived polymers or partially pyrolyzed polymers such as recycled polyethylene, and PET bottle derivatives such as ground particles.

In one embodiment, the composition of the dense layer is $(La_{0.18}Sr_{0.8})(Fe_{0.7}Cr_{0.3})O_{3-x}$ having a thickness of about 0.6 mm. Each of the porous layers of the membrane (about 150-500 microns thick) are of identical composition with porosity in the range of about 40-80%, and preferably in the range of about 60-70% with an average pore diameter in the range of about 1-200 microns, and preferably within about 40-120 microns. Based on the expansion/contraction of the membrane as a function of a change in the partial pressure of oxygen in the gas composition, stresses in the membrane can be calculated using analogy to thermal stresses. At steady state, the gradient across the membrane is nearly linear with the result one side is in tension while the other side is in compression of roughly equal magnitude. As the partial pressure of oxygen in the process gas is reduced while on the air side it is kept constant, stress build up across the membrane may exceed strength resulting in failure. With the addition of porous layers, the failure could be avoided even when the partial pressure of oxygen in the process gas is reduced well below the level at which fracture occurred. For example, when oxygen partial pressure of the process gas was reduced to less than $10^{-14}$ atm, membranes without porous layers fractured while membranes with porous layers could withstand $10^{-15}$ atm without fracturing.

In another embodiment of the invention, at least one of the porous layers of the membrane of the gas processing system is coated with a non-load bearing material selected from the group consisting of a catalyst, an electrically conductive material, and combinations thereof. Generally, the catalyst includes an active phase selected from the group consisting of cobalt, nickel, platinum, palladium, ruthenium, rhodium, iron, copper, and mixtures thereof and a support phase selected from the group consisting of alumina, doped zirconia, doped ceria, lanthanum containing oxides, and mixtures thereof. Alternatively, the catalyst is a non-precious metal catalyst, such as nickel supported on ceramic oxides, and includes oxygen conducting $ABO_3$ perovskites e.g. $(La_{0.2}Sr_{0.8})(Fe_{0.7}Cr_{0.2}Co_{0.1})O_3$ and $ABO_2$ fluorites that have tolerance for variation in stoichiometry. For $ABO_3$, the A site is selected from rare earth metals such as lanthanum, praseodymium, samarium, and ytterbium, and alkaline earth metals including strontium, barium, calcium, and magnesium, and the B site is selected from transition metals such as chromium, iron, cobalt, copper, nickel, and gallium, and an alkaline earth metal including barium, calcium, magnesium, and strontium. For $ABO_2$ fluorites, the A site is either zirconium or cerium and the B site is either yttrium, samarium, scandium, magnesium, calcium or rare earth metals such as gadolinium.

In still yet another embodiment of the invention, at least one of the porous layers of the membrane of the gas processing system is coated with a sulfur tolerant catalyst. In this embodiment, the sulfur tolerant catalyst utilizes a ceria based catalyst for sulfur tolerance which shuttles oxygen ions to the active sites at the surface to prevent the formation of either coke or sulfur poisoning. While not wanting to be bound by theory, active metal sites are blocked by either carbon or sulfur when they are strongly adsorbed and either blocks other hydrocarbons, or steam, in the gas phase from adsorbing, which is what sulfur does; or it provides additional sites for them to start to react as in coking. The ceria-based support facilitates the shuttling of oxygen ions to the reaction sites which produces hydroxyl (—OH) groups, so that carbon quickly reacts to produce carbon monoxide and sulfur reacts to produce sulfur dioxide or hydrogen sulfide. In both cases the presence of the —OH groups at the reaction site promotes the prevention of permanent sulfur poisoning. The active site is supplied from the active metal, which in this case can be cobalt, copper, nickel, or the noble metals such as platinum, palladium, ruthenium, and rhodium, but preferably cobalt due to high cost of the precious metals. Cobalt is typically not utilized due to its low activity, but sulfur is not as strongly adsorbed as in the case of utilizing nickel. The ceria, $CeO_2$, can be doped or mixed with another oxide such as lanthanum, gadolinium, calcium, strontium, and samarium, but preferably lanthanum at a level from 5 mole % of the cerium to 95% of the cerium.

In a further embodiment of the invention, the catalyst is supported on a oxygen conducting ceramic membrane such as yttria stabilized zirconia, Gd doped $CeO_2$ and $ABO_3$ perovskites where A site is occupied by rare earth and alkaline earth metal (e.g., $La_{0.2}Sr_{0.8}$, wherein 20% of A sites are occupied by lanthanum and 80% of the A sites are occupied by strontium), the B site is occupied by one or more of transition metals such as chromium, iron, cobalt, and combinations thereof. As a result, the catalyst is contacted by a hydrocarbon feed, steam, and even oxygen permeating through the porous layer. For example, cobalt on lanthanum cerium oxide can be deposited on such membranes to provide steam reforming of hydrocarbon fuels that contain high sulfur. This is particularly suitable for military application where the preferred fuel is JP8. A particularly useful oxide family belonging to scheelite structure may be incorporated in formulating the sulfur tolerant catalyst. Transition metal molybdates (such as nickel, iron, cobalt) and cerium molybdates with active metals such as cobalt, doped cerium oxides or cerates along with any oxygen, hydrogen conducting ionic or ionic/electronic conducting materials are useful for this purpose.

By creating a controlled porosity structure on both sides of the dense layer allows the dense layer to operate in a stable manner at the second gas and the dense layer wall interface, thereby allowing operation stably at a partial pressure of oxygen that is much above its value in the bulk, or away from the interface. Therefore, the membrane can be operated in such a manner that strength to stress ratio is sufficiently high for operation free from mechanical failure. The structure additionally provides channels for heating passages so that unused fuel may be combined with air to (a) provide thermal energy to maintain the fuel cell at operating temperature and (b) preheat incoming gas streams. With these benefits, it is envisaged that three separate components in the system, i.e., a reformer, a heat exchanger and a fuel cell may be integrated into a single compact unit.

The membrane materials include materials selected from the group consisting of perovskites ($ABO_3$), fluorites ($ABO_2$), and electronic conductors. The perovskites ($ABO_3$) include A site elements that are selected from rare earth and alkaline earths with site occupancy on A site preferably below 1.0. Preferable elements are lanthanum and strontium. B site elements are selected from transition metals, as well as alkaline earths and Group 13 (defined by IUPAC convention). Preferably these elements are iron, chromium, manganese, cobalt, titanium, and gadolinium. It should be recognized that there are other perovskites that have oxygen ionic conductivity such as $Sr_{0.98}FeO3$, $Sr_{0.98}CoO3$, etc. It is possible to obtain a dense layer material belonging to the perovskite family that is either an ionic conductor, electronic conductor or mixed (ionic & electronic) conductor. The fluorites ($ABO_2$), include materials such as yttria stabilized zirconia ($ZrO_2$ and about 5-8 mole % $Y_2O_3$) and Gd doped $CeO_2$ (about 10-20 mole % $Gd_2O_3$). These materials are predominantly ionic conductors. In the case of fuel cells, electrodes are needed to obtain power, while in the case of reformer type materials, it is preferable to incorporate a second phase that is an electronic conductor and compatible with the ionic conducting phase. The electronic conductors include noble metals including, but not limited to, platinum, gold, silver, and palladium, and ceramics including, but not limited to, perovskites $ABO_3$ in which A is preferably lanthanum and B is preferably chromium, and doped oxides such as titanium dioxide and cerium dioxide. In the case of gas processing reactors where the output is electric power, such electronic conductors are typically not necessary. However, in the case of reformer type applications, the purpose of these metals is to provide electronic conductivity to compensate the charge build up generated in purely ionic conductors.

In another embodiment of the invention, the membrane may be utilized in reformer applications. In this case, the dense layer includes single phase and dual phase materials.

The single phase materials include materials having the generic formula $ABO_{3-x}$ and being a perovskite material. The A site of the perovskite material is occupied by a combination of alkaline and rare earth metals selected from the group consisting of strontium, barium, lanthanum, yttrium, calcium. In one example, the A site is occupied by lanthanum and strontium, wherein lanthanum=0.05-0.4, strontium=0.6-0.95 and the combination of lanthanum and strontium is <1. The B site of the perovskite material is occupied by a combination by transition metals selected from the group consisting of iron, chromium, manganese, cobalt, nickel, titanium, aluminum and magnesium with total=1 provided overall composition is single phase. The value of X is equal to the oxygen deficiency created to maintain charge neutrality in the perovskite material. Specific examples include $(La0.19Sr0.8)(Fe0.7Cr0.2Cu0.1)O_{3-x}$ and $(La0.18Sr0.8)(Fe0.79Cr0.2Mg0.01)O_{3-x}$.

The dual phase materials include materials having the generic formula $ABO_{2-x}$+ metal and $(La_xM_1)(Cr_yM_2)O_{3-x}$, wherein x is the oxygen vacancy concentration and is the site occupancy of less than or equal to 1 per unit cell by lanthanum, M1 is an alkaline earth metal on the lanthanum site, y is site occupancy per unit cell by chromium of less than or equal to 1, M2 is transition metal on chromium site selected from the group consisting of iron, cobalt, nickel, manganese, titanium, aluminum and magnesium. Specific examples include $[ZrO_2+8\%Y_2O_3]$ 50-80 vol % and balance from one or more of gold, platinum, palladium, lanthanum chromite, and $(La0.9Ca0.1)(Cr0.9Fe0.1)O_{3-x}$.

In yet another embodiment, the membrane may be utilized in fuel cell applications. In this application, an electrolyte and interconnect are further required. The electrolyte includes materials including $ZrO_2+8\%Y_2O_3$, $CeO_2+20\%Gd_2O_3$, and $CeO_2+m\%Sm_2O_3$ which are described by a generic formula $A_xB_{1-x}O_{2-y}$. In this formula, A is a tetravalent element selected from the group consisting of zirconium, and cerium, and B is a trivalent rare earth element and/or divalent alkaline earth element selected from the group consisting of calcium and magnesium, x is partial replacement of a tetravalent element by either trivalent or divalent element, and y is oxygen vacancy per unit cell. The interconnect includes $[ZrO_2+8\% Y_2O_3]$ 50-80 vol % and balance from one or more of gold, platinum, palladium, lanthanum chromite, and $(La0.9Ca0.1)(Cr0.9Fe0.1)O_{3-x}$.

In still yet another embodiment, the membrane may be utilized in applications for separating oxygen from air. In this application, the first gas is air and the second gas is steam, either inert or under vacuum. The dense layer and the porous layers of the membrane are single phase materials having the generic formula $ABO_{3-x}$.

The A site of the perovskite material is occupied by a combination of alkaline and rare earth metals selected from the group consisting of strontium, barium, lanthanum, yttrium, calcium. In one example, the A site is occupied by lanthanum and strontium, wherein lanthanum=0-0.2 and the balance is strontium and the combination of lanthanum and strontium is ≤1. The B site is occupied by a combination by transition metals selected from the group consisting of iron, cobalt, and manganese. The value of X is equal to the oxygen deficiency created to maintain charge neutrality in the material. Specific examples include $Sr[Cu0.8Fe0.2]O_{3-x}$ and $La0.3Sr0.7CoO_{3-x}$.

The elements of the various applications described above may be fabricated by a number of methods so as to create a membrane having a graded porosity adjacent to the dense layer. Some of the methods are described below:

Freeze Casting

A ceramic slurry can be subjected to freezing in such a manner that a dense film forms at the slurry-mold or slurry-Mylar interface, immediately upon initiation of the cooling process. Subsequent exposure to the cold mold surface causes dendrites of ice crystals to grow, creating interstitial space filled with concentrated ceramic slurry. Upon subjecting the frozen assembly to a vacuum, frozen water can be removed in the vapor phase or sublimation, leaving behind a dense film followed by a graded porous structure, which after sintering produces a sintered structure. The two layers are then laminated or joined by well known techniques to produce a symmetric (two layers processed under identical conditions) or asymmetric structure (two layers processed under different conditions), with graded porosity on either side of a dense gas impermeable layer. In the case of tubular geometry, the internal portion of the tube is subjected to controlled freezing in a tube mold (analogous to molds used in making popsicles). Once the structure is rigid, it is removed from the mold and used to create outer porous layer by dipping it into a liquid slurry, similar to the one used for tube interior. After build up of a frozen film around the first frozen part, the assembly is taken out to remove the water by sublimation. Subsequent processing involving binder burn-off and sintering is similar to the planar structure.

Injection Molding or Extrusion

Followed by the freeze casting of the slurry coating or an alternative coating containing a pore-former to form one side surface with graded porosity, ceramic powders of desired compositions that can be sintered, using conventional ceramic processing, are mixed with a polymer mixture to produce a plastically deformable mixture at a suitable temperature. Such a deformable mass is shaped into a one-ended closed tube, two-ended open tube, thin sheets, or any suitable shape relevant to reformer or solid oxide fuel cell designs. After shaping or molding into a self-supporting body, it is coated to create a dense film followed by a graded porous structure. Care is taken to ensure that the sintering rates of the two shapes are sufficiently close to prevent any cracks attributable to differential sintering.

Tape Casting/Slurry Coating Preforms

This is one of the two preferred fabrication processes to produce reactors according to the proposed invention. The tape casting process is routinely used to cast a thin sheet of ceramic tape, which is then processed further to yield thin sheets of dense ceramic membrane. "Tape Casting—Theory and Practice" by Richard Missler & Eric Twiname (The American Ceramic Society ISBN 1-57498-029-7 2000) lists several recipes for tape casting various ceramic powders. The recipe depends upon the batch of ceramic powder(s) utilized and their chemical properties. The chosen recipe, either aqueous or non-aqueous, provide a baseline and the viscosity of the slip is adjusted to meet specific processing needs. It is envisioned that the use of a given recipe will create a dense and a porous structure. The process has sufficient flexibility to create either a simple single phase monolithic body, such as a multi-cell reformer or a solid oxide fuel cell.

For example, acrylic binders in a water based system may be used in the tape casting process. Aluminum oxide is replaced by either an $ABO_{3-x}$ perovskite composition for the reformer and the oxygen generator, or yttria stabilized zirconia powder for the solid oxide fuel cell, having equivalent surface area and volume loading. Equivalence is based on viscosity of the slip. Quality of the slip is determined by casting a small batch of slip on a Mylar-lined glass plate, using a doctor blade to produce a non-porous tape of about 70-100 microns. If the tape, upon firing, produces a pore-free, thin, dense (>99% of theoretical density) sheet of yttria stabilized zirconia (YSZ), then it is suitable for use in fabricating a cross-flow based reactor.

The next step is to select a polyurethane foam or foams of desired pore size and sheet thickness. One foam, having high permeability (pressure drop less than 10 psi across the module layer), may be used on the air side while the other, having different pore-structure (finer) may be used for the fuel side. The thickness of each layer may be determined by the flow characteristics needed during the operation of the reactor. Five layers are produced by using the same ceramic tape formulation. These are described below for producing a reformer. In this case, the ceramic may be perovskite $ABO3-x$ where the A-site element consists of alkaline earth and rare earth elements, while the B-site is most often a transition metal such that it has mixed conduction (ionic and electronic) and it is stable in reforming atmosphere. In the case of the SOFC, while three layers have essentially the same composition of YSZ, the other two layers additionally contain interconnect ceramic such as lanthanum chromite. To address both cases and for the sake of simplicity, the ceramic is referred to as having composition P1 and the slip as composition S1. In other words, for the reformer, the ceramic is P1 and is a perovskite, while for the SOFC P1 is YSZ.

A multi-layer construct may be formed of the following layers:

Layer 1: A dense layer of P1 may be cast using S1 and the standard procedure given in the reference above. The tape cast layer thickness is in the range of about 100-1000 microns and preferably in the range of about 100-300 microns. The tape is then ready for accepting layer 2.

Layer 2: A sheet of reticulated polyurethane foam (80 ppi or pore per inch) about 1/16" thick may be dip coated in S1 and passed through a set of rollers to squeeze out excess slurry. The properties of S1 are such that it coats the webs of polyurethane foam uniformly. The sheet is then ready for assembly on layer 1. This sheet can then be transferred onto layer 1 and allowed to dry in a controlled manner.

Layer 3 and 4 are assembled in a manner similar to Layer 1 and 2. For layer 3, a dense layer of P1 may be cast using S1.

The tape thickness is preferably in the range of about 50-100 microns. Layer 4 is a coated foam having pore size slightly larger for air supply. After drying they are stripped off the carrier film used in layer 3 since layer 4 provides sufficient mechanical strength for handling. Layer 3 and 4 can be placed on Layer 1 and 2 according to their layer number, so that dense/porous layers are alternated for producing reformer or for producing a SOFC for example.

Layer 5: A dense layer of P1 may be cast using S1 and it is similar to Layer 1 in thickness. After controlled drying, it can be placed on layer 4 with carrier film on outer surface.

Alternately, it is possible to create each layer separately in semi-dried state and assemble them to create multi-cellular structure by lamination. It is possible to incorporate dense regions in the porous sections (Layers 2 and 4) by filling the space with S1 after excess slurry has been squeezed out and before assembling layers into a stack. These regions are strictly limited to the edges having width that is sufficiently wide for providing sealing surfaces.

Single Stack or Unit Cell Assembly

Layers 1 through 5 may be placed together so that there is an alternating dense and porous layer with air side porous layer being more open than the fuel side. The carrier films on Layers 1 and 5 are on outer faces providing a confinement. The assembly can then be moved through a system of rollers placed in a humid chamber where the humidity is level is controlled, preferably above 70%, and at a temperature close to the glass transition point of the dried tape. By applying controlled pressure at a temperature where humidity allows bonding of different layers, a monolithic green body of a single stack can be produced. After consolidation treatment, the assembly is dried in a controlled manner by blowing air through porous layers so that drying shrinkages are uniform through the cross-section.

Multi-Stack Assembly

Single stacks may be joined to produce multi-layer cell stacks in the green state. A lower density interface may be used between Layer 5 of cell 1 and Layer 1 of cell 2. The purpose of this layer is to provide a controlled failure zone which will not disrupt operation of cell 1 and cell 2 in a multi-cell stack.

Blocking Channels for Cross-Flow Reactor

After assembly of the layers, blocked layers 2 and 4 may be recoated with S1 to cover potential pores generated by poor coatings on the web sections.

Processing of the Assembled Green Body to Produce Ceramic Monolithic Reactor Module The assembled green body (after post-assembly coating by S1) may then be subjected to controlled drying and binder burn-off. The process for controlled drying by using a combination of controlled humidity air and temperature is well known to those skilled in the art of ceramic processing. The governing criterion, is to manage the density gradients and shrinkages within the assembly, so that stresses produced during these processing steps are below the fracture strength. Following binder burn-off, the assembly is subjected to sintering so as to densify Layers 1, 3 and 5, to produce gas impermeable layers. Layers 2 and 4 on the other hand, produce a positive replica of underlying reticulated foam structure. The resultant structure is suitable for operating it as a reformer after integrating it with manifolds and supporting infrastructure.

Lost Wax Process

This is one of the two preferred processes to create monolithic ceramic reactors described in various embodiments. The primary advantage of this process is similar to the process described above, i.e., the ceramic-organic binder is essentially identical in either the dense or porous layer. While in previous cases the pore structure was a positive replica of the porous reticulated foam, this process generates a negative replica of the wax structure. The dense and porous layer can be produced in separate steps by conventional processes such as extrusion, roll forming or compression molding, and assembled together in a compression molding die. After allowing the binder to cure, the green ceramic body has sufficient strength to allow melting of the wax pore-former. Following removal of wax, subsequent steps of binder burn-off and sintering are similar to those described above.

Process of Preparing a Monolithic Reactor Module

Sinterable powder of a mixed conducting perovskite of the type $ABO_{3-x}$ having a sufficiently high electronic and ionic conductivity or yttria stabilized zirconia used in SOFC may be used as the basic ingredient of producing a "green" body. The term "green" refers to a self-supporting structure consisting ceramic powder, organic or inorganic binders and liquid medium. This body upon binder burn-off is subjected to a high temperature sintering process to yield a dense ceramic body. The basic recipe is as follows:

Ceramic powder, C1, having surface area between 5 and 10 $m^2/gm$ and without any hard agglomerates: 45-50 vol %
Polyester resin+Hardener (MEK Peroxide): 50 vol %
Optional viscosity modifier, for example a styrene monomer: 0-5%

The components may be mixed in a Ross mixer under vacuum for de-aeration to produce a uniform paste having viscosity in the range of about 10-100 (pascal.seconds). The amount of styrene and ceramic loading may be altered so that the viscosity of the resultant mixture is within the desired range. The resultant mix is called M1.

M1 may then be mixed with wax beads with size in the range of about 100-500 microns so that volume fraction of wax is at least about 70% and preferably in a range of about 75-85%. A sigma blade or any low shear mixer may be used to produce a highly viscous reaction mixture. This mixture is called M2.

M1 may then be mixed with wax beads with size in the range of 50-1000 microns so that volume fraction of wax is at least about 70% and preferably in a range of about 75-85%. A sigma blade or any low shear mixer may be used to produce a highly viscous reaction mixture. This mixture is called M3.

M1, M2 and M3 may then be co-extruded either in one step or multiple steps in order to produce a five layer stack. The layers may be extruded so as to cure them partially either by controlling processing time at a given temperature and then reducing temperature to prevent further curing or by adjusting catalyst content to provide sufficiently long gel time.

Multiple cell stacks can be produced by assembling layers on top of each other and then subjecting the assembly to final cure preferably by subjecting it to final curing temperature.

After final curing, temperature may be slowly (0.5-2° C./hour) raised to about 120° C. and held there for at least one hour and preferably for 4 hours then to about 180° C. at which wax pore-former is allowed to melt and drain out of the assembled layer. Controlled air pressure may be used to drain the wax.

The remaining structure may then be subjected to binder burn-off in air at about 0.5 to 1° C./hour from about 180° C. to about 450° C. From about 450° C., the temperature is raised at a rate between 1 and 10° C./hour and preferably within 2-5° C./hour to sintering temperature. For many perovskite compositions suitable for reformer applications, this temperature is usually between about 1300° C. and about 1600° C. The overall composition is determined by precise composition of A site and B site in $ABO_{3-x}$ perovskites and characteristics of powder such as surface area, particle size distribution, and sintering aids. Usually, the sintering time, in the range of about 1 to 6 hours, is sufficient to achieve 98+% of the theoretical density. After sintering the atmosphere is changed to inert atmosphere and it is allowed to cool slowly at a temperature below about 1000° C. at a rate in the range of about 0.5 to 10° C./hour and preferably within about 1-5° C./hour so that stresses induced by oxygen vacancy gradients are below 1000 psi.

In the case of a solid oxide fuel cell, C1 is yttria stabilized zirconia. The ceramic thin sheet can be produced by either tape casting or extruding. After partial curing, holes may be punched into the sheets for filling them in with lanthanum chromite based interconnect ceramic slip C2. This slip is produced by the identical process used for YSZ slip. C1 and C2 should have the characteristics including green density, powder particle size distribution, particle surface area, such that they can be co-fired without substantial warping or cracking. Thus, when these two formulations are cast or extruded (or extruded and rolled) together into a bi-layer and subjected to curing, binder burn-off and sintering, the resultant layer should be substantially free of cracks or pores and substantially free of any camber (or less than 1 micron/25 mm of length). This test will determine if C1 and C2 are suitable for producing such layers. Once holes are cut into the YSZ tape (e.g., by punching), they can be filled with C2 by tape casting or any other suitable processing technique. This layer is then subjected to partial cure and used for final assembly.

After the final assembly of the module, it may then be subjected to a final cure. At this point polymer should provide sufficient strength to the structure for de-waxing. The rest of the processing steps are similar to those used in producing a reformer. Exact temperature and time will be determined by the sintering characteristics of YSZ and lanthanum chromite powders, volume fraction of resin, etc. In the case of SOFC, it may not be necessary to control atmosphere during cool down as it is essential for reformer based on mixed conducting perovskites.

Electrodes and Catalysts

In embodiments encompassing a solid oxide fuel cell, the electrolysis of water, hydrogen generation, and an oxygen pump that involve electrochemical reactions at the membrane gas interface, electrodes are needed to make connections between thin dense membrane and interconnect. For these examples, electrodes are introduced through infiltration of porous layers by suitable slurries, ceramic or metallic electrode material precursors. Following an infiltration step, the reactor module is subjected to thermal treatment or pyrolysis that results in decomposition of precursors and coating of webs in the porous section. It is understood that materials for fuel section and air section may be different and require separate processing steps. For those skilled in the art, this is a routinely employed procedure in the industry, e.g., dimensionally stable anodes in the production of chlorine in chlor-alkali cells, or coating catalytic converters. In other embodiments that do not require electrodes but catalysts, e.g., reformer, pressure driven oxygen separators, hydrogen separators, similar processing schemes can be used to deposit catalysts. Tortuous path offered by webs coated with either catalysts or electrodes or both permit efficient processing of gases in the porous region.

Sealing

Reactor elements described above may be sealed to the structural part of the metal reactor, such as a flange, by using a sealing material that is compliant in order to compensate the stresses from differential expansion or contraction of the two parts including the structural component and the functional component (oxygen conducting membrane). Such a seal can be fabricated out of ceramic fiber rope, ceramic paper, ceramic fiber felt, glass, expanded vermiculite or mica and/or a ductile metal like silver, gold or their combinations.

There are several modifications to processes and architectures described above and it is understood by those skilled in the art that there is large body of information in implementing essential teaching of this invention by modifying the suggested fabrication process or processes. Some of the variations are given in the following sections.

Solid Oxide Fuel Cell: Planar Cell with an Interconnect having a Built-in Inter Stack Stress Release Layer Prior art solid oxide fuel cells having a graded porosity with a dense gas impermeable layer are known. However, these designs are based upon planar cells. One problem of this design is that it requires co-firing multiple layers of yttria stabilized zirconia and lanthanum chromite interconnects, which requires the shrinkage and the coefficient of thermal expansion matching of the two materials. One way to overcome this problem is to use interconnect material in discrete small segments in YSZ matrix or have two interconnected structures of YSZ and lanthanum chromite. In another embodiment, a thin porous layer of interconnect may be introduced between repeat units so as to create electrically connecting but stress tolerant assembly. Mechanical failure along this preferred failure point will allow electrical connectivity without significantly affecting power output of that unit cell.

The advantage of using this approach is to achieve greater manufacturing yields. The porous stress release layer can be made out of one or more materials from the following group; (1) the same material as the interconnect composition (2) highly conducting thin noble metal or (3) a composite of YSZ fibers and interconnect material. However, bonding between cells must be very low electrical resistance, 65% of the power is lost in SOFC stacks due to the contact resistance between individual cells from manually stacking.

This technology can also be used for connecting multiple stacks. In the SOFC industry, the highest stacks are generally 60-cells high, which are typically too high for co-firing. Because each 10-cell stack will be different in its degree of flatness, when the time comes to stack 6, 10-cell stacks on top of each other, there will be difficulty in joining them together. The technology discussed herein may solve this problem by the use of a compliant layer of fibers, YSZ, LSF or other perovskite, a thin layer of gold, etc.

In another embodiment, the solid oxide fuel cell may be operated in reverse. In this case, electricity is used to electrolyze water vapor at high temperature to produce hydrogen on the water side of the membrane and pure oxygen on the opposite side of the membrane.

Oxygen Pump

The embodiment for solid oxide fuel cell is equally applicable to carrying out separating oxygen from air and increase the pressure on the supply side.

In another embodiment the membrane material is either a mixed (electronic and ionic) conductor or purely ionic conductor. On one side of the dense layer is air while oxygen ions are conducted through the dense layer. On the other side of the dense layer, essentially pure oxygen can be produced. The driving force is provided by the difference in partial pressure of oxygen across the membrane. This may be accomplished by either applying pressure or vacuum. In the case of a purely ionic conducting membrane, electrodes are in contact with the thin membrane so as to drive oxygen across the membrane using an electric field (i.e. field assisted oxygen separation). In this application the device may act as an oxygen pump, and oxygen can be pumped to hundreds, or perhaps thousands, of psi in pressure above that of the air pressure. For the pressure driven separation, the structure of the reactor module may be identical to that of a reformer. For an electrically driven system, the structure of the module is substantially identical to that of a solid oxide fuel cell.

In the embodiment for steam methane reforming as described above, it is applicable to separating oxygen from air using a pressure differential to drive oxygen from the air side to the pure oxygen side. Since partial pressure of oxygen gradient is significantly lower and absolute magnitude of oxygen partial pressure is much higher than the reformer case, membrane materials will be different. However, the basic principles of architecture and fabrication processes would remain the same.

Hydrogen Separation

The embodiment for steam methane reforming described above is applicable to separating hydrogen from hydrogen containing gases such as syngas produced by steam reforming. However, in this case, the membrane material will be different. Instead of oxygen conducting membranes, proton conducting membrane materials, such as barium cerate and its derivatives, may be used. However, the basic principles of architecture and fabrication processes would remain the same.

Tubular SOFC

In yet another embodiment of the invention, the architecture shown for single unit cells can be used to fabricate tubular solid oxide fuel cell elements such as one end closed tube or a both end open tube. Advantages of having a tubular design is that the fuel gas environment can be kept uniform along its length thereby reducing axial stresses created by variation in oxygen vacancy concentration. The tubular SOFC designs can be based on modified shell and tube heat exchangers that use either one end closed tubes or both end open tubes. Seals described in a section above are applicable to these designs.

Solid Oxide Fuel Cell with Integrated Reformer

In another embodiment of the invention, the membrane utilized for traditional design of solid oxide fuel cell may be combined with a reformer having a sulfur tolerant catalyst, as previously described herein. It is envisioned that this type of reactor may facilitate power generation using sulfur rich fuels like JP8 and, therefore, satisfy a need capable of meeting rigid military requirements.

The best mode for carrying out the invention has been described for the purposes of illustrating the best mode known to the applicant at the time. The examples are illustrative only and not meant to limit the invention, as measured by the scope and spirit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A method of processing at least two gasses in a gas processing system, the method comprising the steps of:
providing a membrane including: a dense, gas impermeable layer, wherein the dense layer is a ceramic oxide material that conducts ions, electrons, and combinations thereof; a first and second porous layer, wherein each of the first and second porous layers is a ceramic oxide material having a non-symmetrical load bearing skeleton of graded porosity, said first porous layer on an air side of said membrane and said second porous layer on a process gas side of said membrane, and wherein the dense layer is positioned between the first and second porous layers;

contacting the first porous layer with a first gas and the second porous layer with a second gas, wherein each porous layer provides a reduction of an oxygen partial pressure gradient across the dense layer and reduces resultant stresses in the dense layer that are small compared to its strength thereby improving long term mechanical durability of the dense layer, and wherein an oxygen partial pressure on the air side of the first porous layer of the membrane being about 0.2 atmospheres and an oxygen partial pressure on the process gas side of the second porous layer of the membrane ranges from about $-10.1$ to about $-12.2$ as measured by log $pO_2$ @ $1000°$ C. resulting in a stress at said second porous layer from about 1,226 psi to about 9,400 psi, said stress being less than a membrane tensile strength; and producing a product selected from the group consisting of synthesis gas, hydrogen gas, and carbon monoxide.

2. The method of claim 1, wherein
the ceramic oxide material of the dense layer includes at least one material selected from the group consisting of a perovskite, a fluorite, a precious metal, and a lanthanum chromite and its derivatives.

3. The method of claim 2, wherein
the perovskite is a metal oxide having a formula of $ABO_{3-x}$, wherein
the A site is occupied by a combination of alkaline and rare earth metals selected from the group consisting of strontium, barium, lanthanum, and cerium and
the B site is occupied by transition metals selected from the group consisting of iron, chromium, manganese, cobalt, nickel, titanium and magnesium.

4. The method of claim 2, wherein
the fluorite is a metal oxide having a of $ABO_{2-x}$, wherein
the A site is occupied by an element selected from the group consisting of zirconium, and cerium, and
the B site is an element selected from the group consisting of yttrium, samarium, scandium, magnesium, calcium, lanthanum and rare earth metals including gadolinium.

5. The method of claim 2, wherein
the precious metal is selected from the group consisting of platinum, palladium, gold, silver, and ruthenium.

6. The method of claim 1, wherein
the first gas is air having a high partial pressure of oxygen.

7. The method of claim 1, wherein
the second gas is a gaseous material selected from the group consisting of natural gas, alcohols, and alkenes.

8. The method of claim 1, wherein
the second gas is a mixture of gaseous material and gasification products of solid materials selected from the group consisting of cellulosic materials.

* * * * *